Dec. 25, 1962    R. F. LANE    3,069,706
OUTSOLE TRIMMING MACHINES
Filed Oct. 12, 1960    9 Sheets-Sheet 1
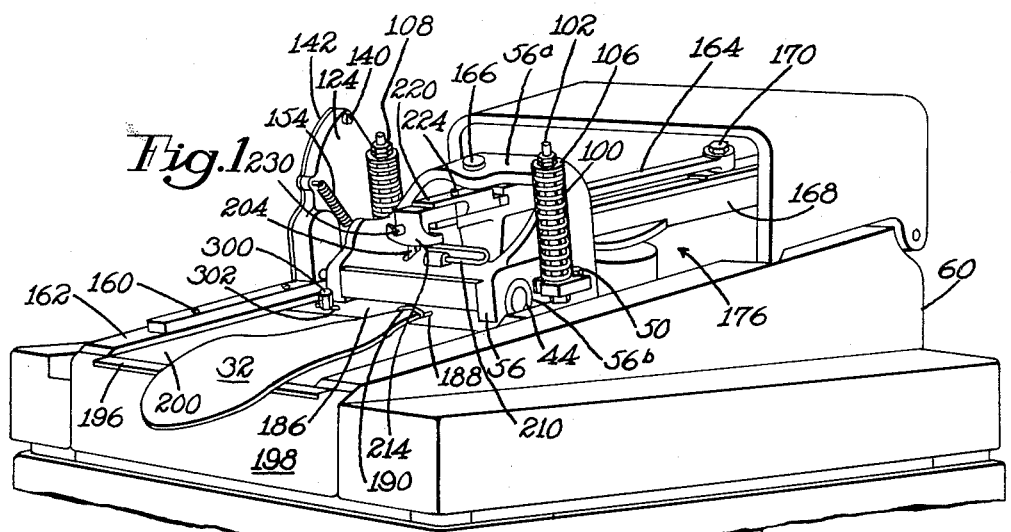
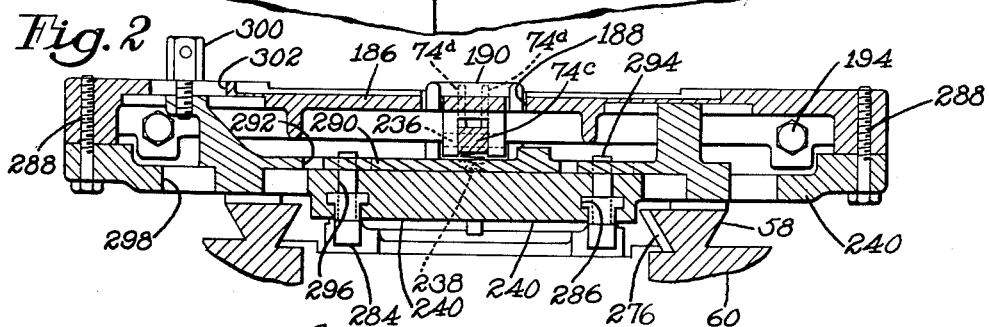
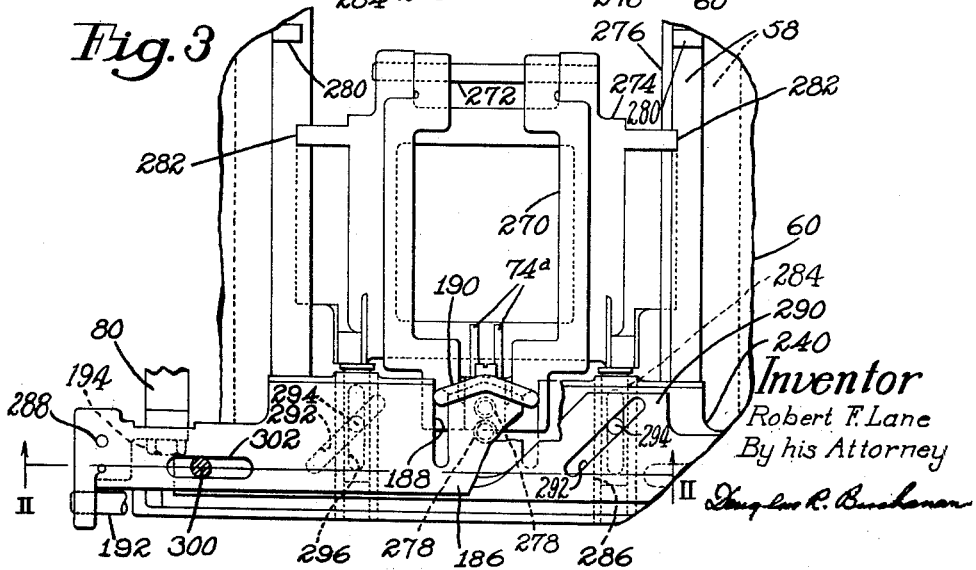
Inventor
Robert F. Lane
By his Attorney
Douglas R. Buchanan

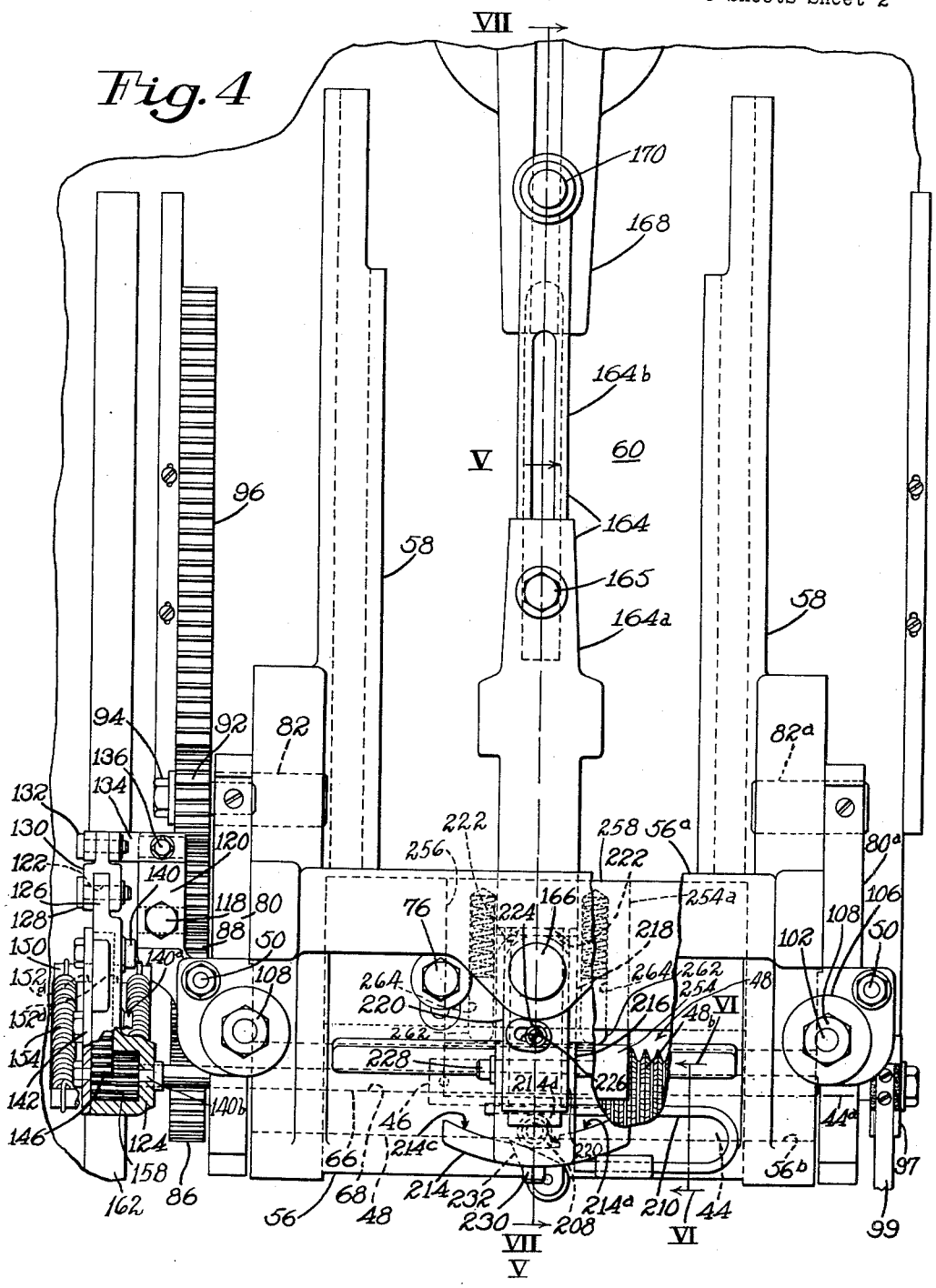

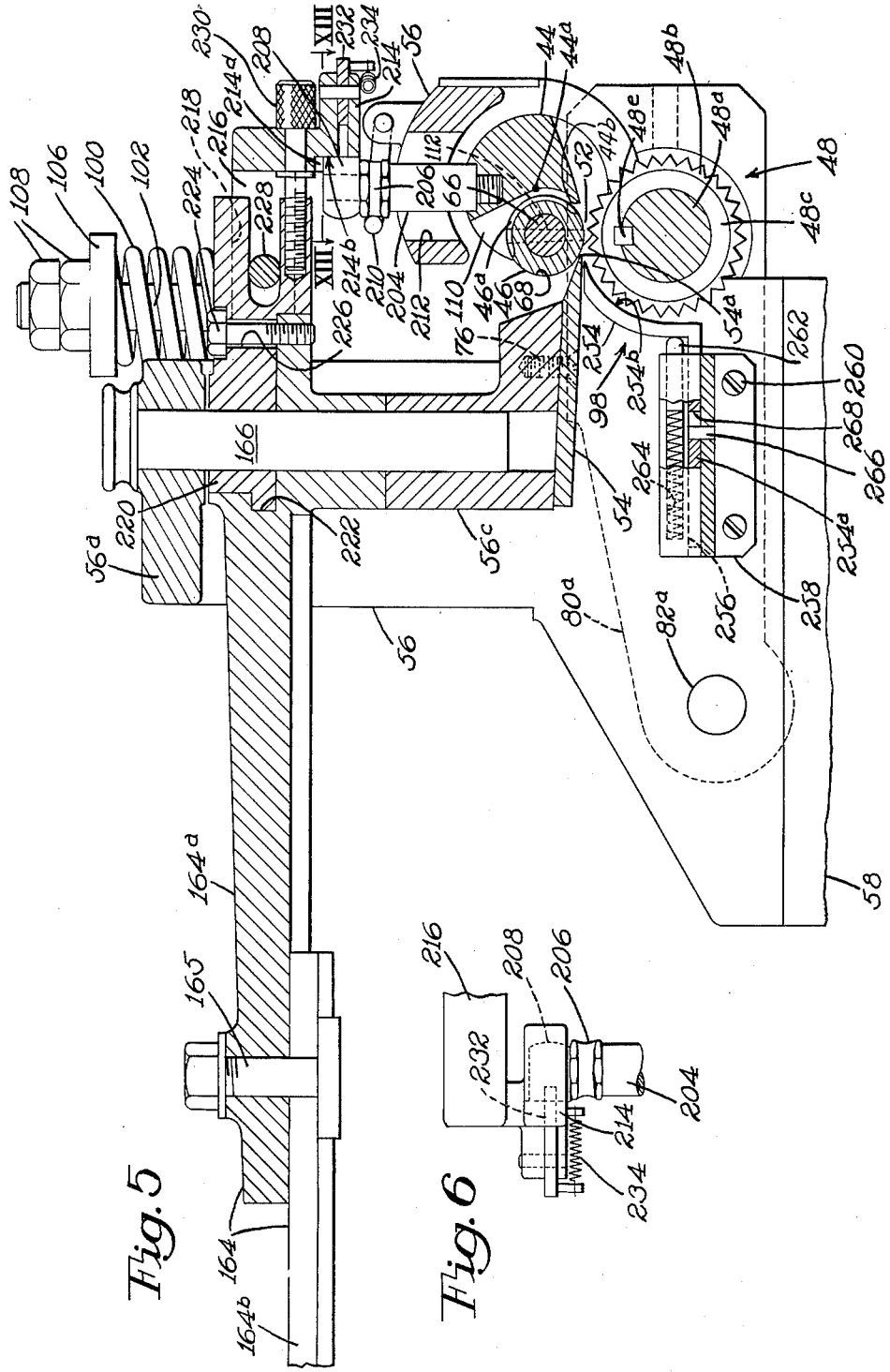

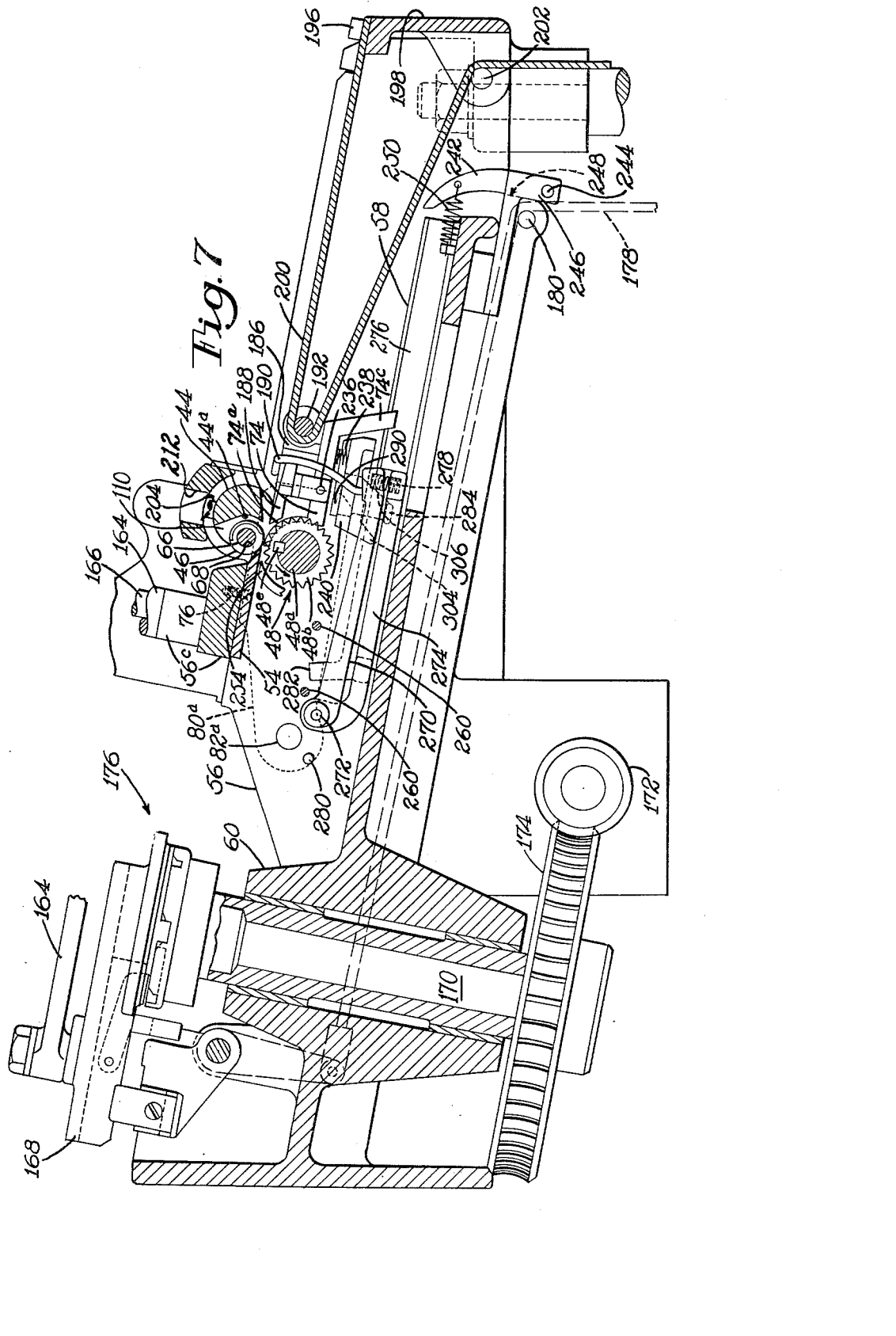

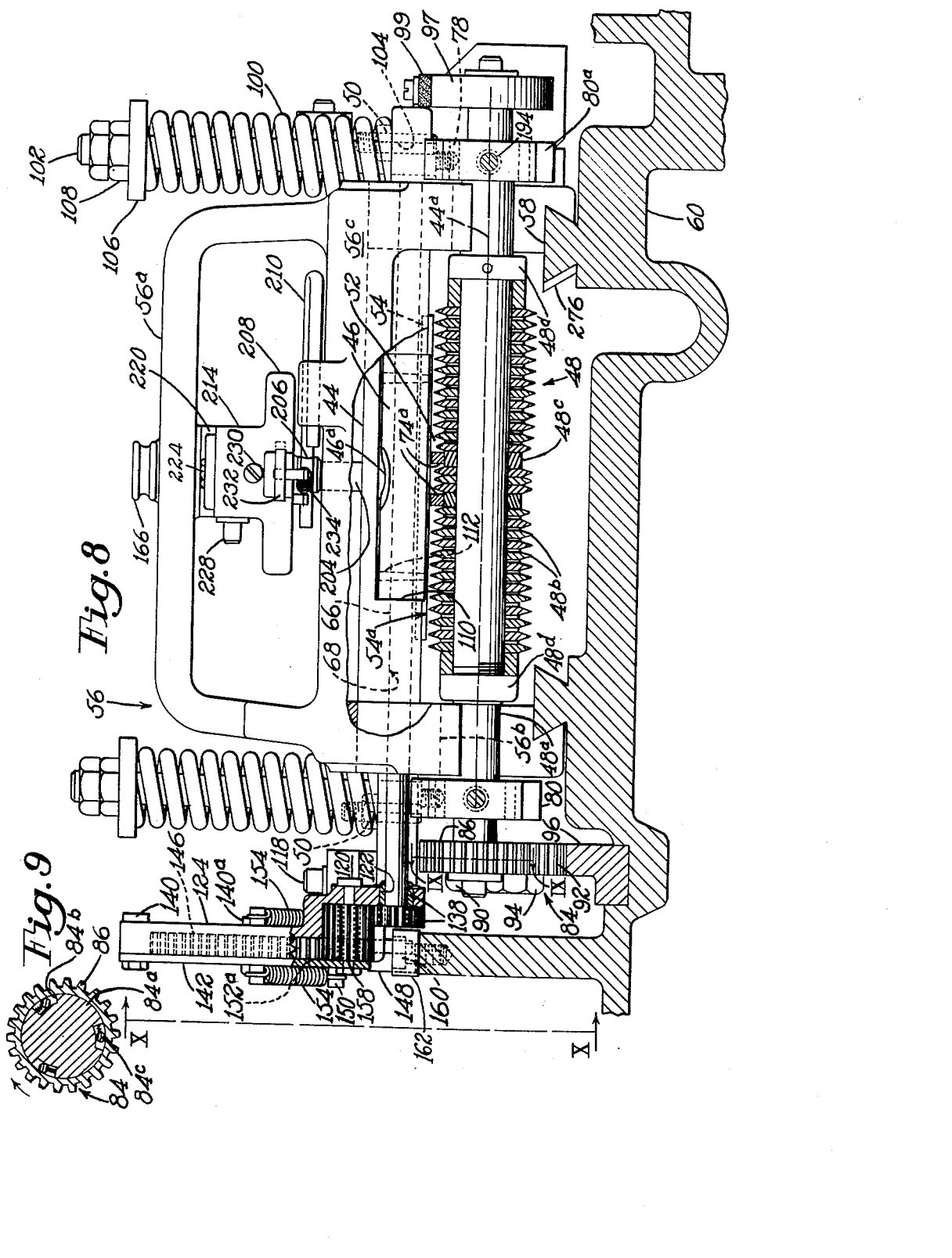

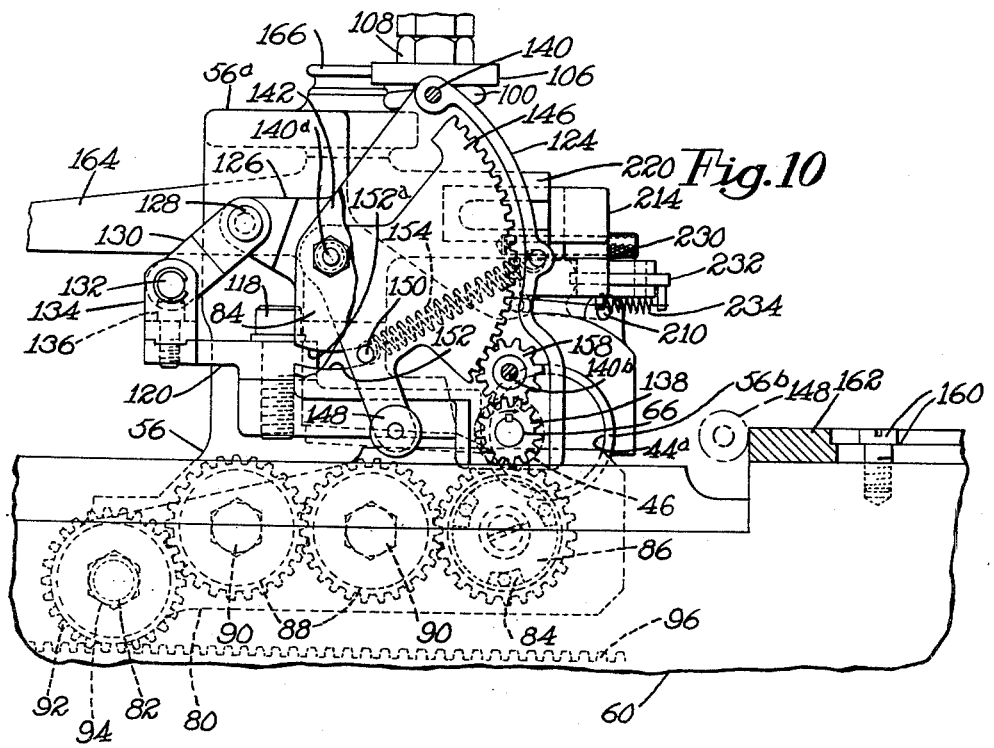
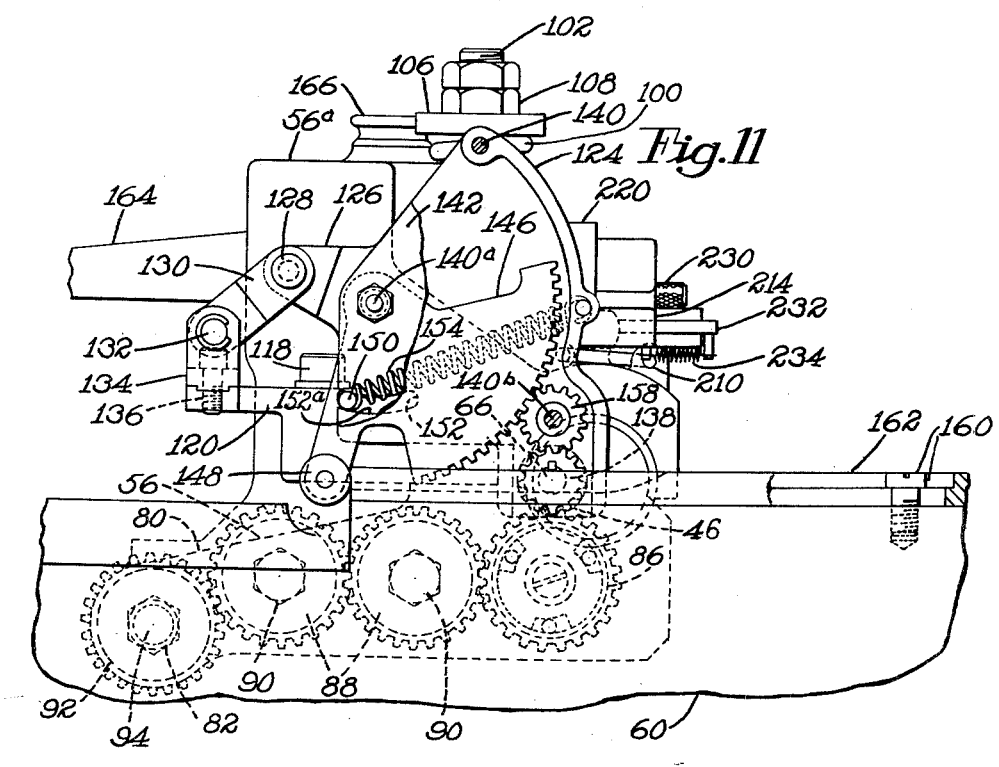

Dec. 25, 1962
R. F. LANE
3,069,706
OUTSOLE TRIMMING MACHINES
Filed Oct. 12, 1960
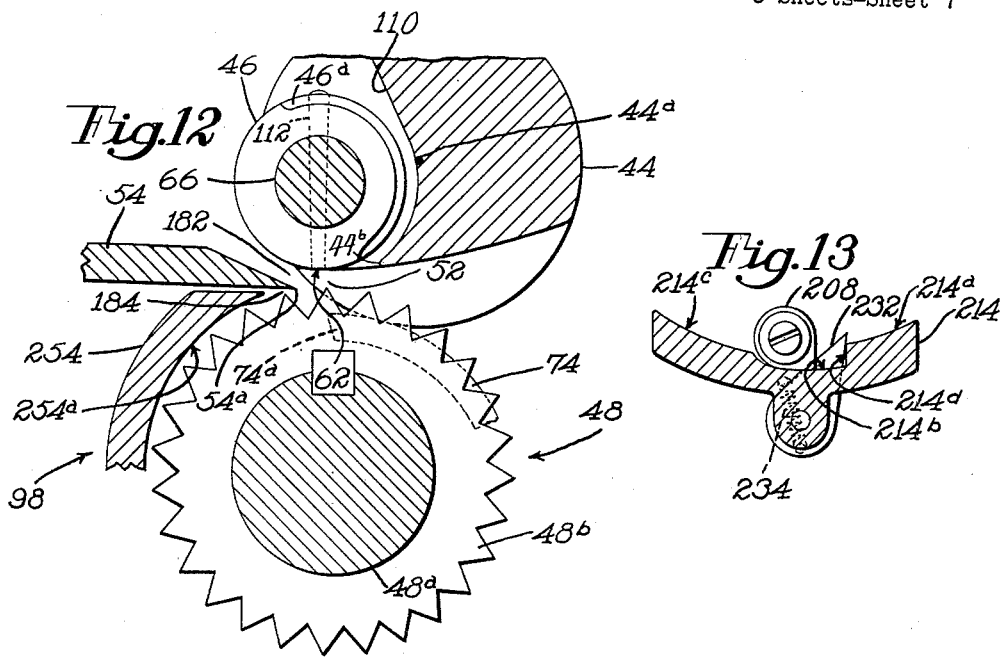
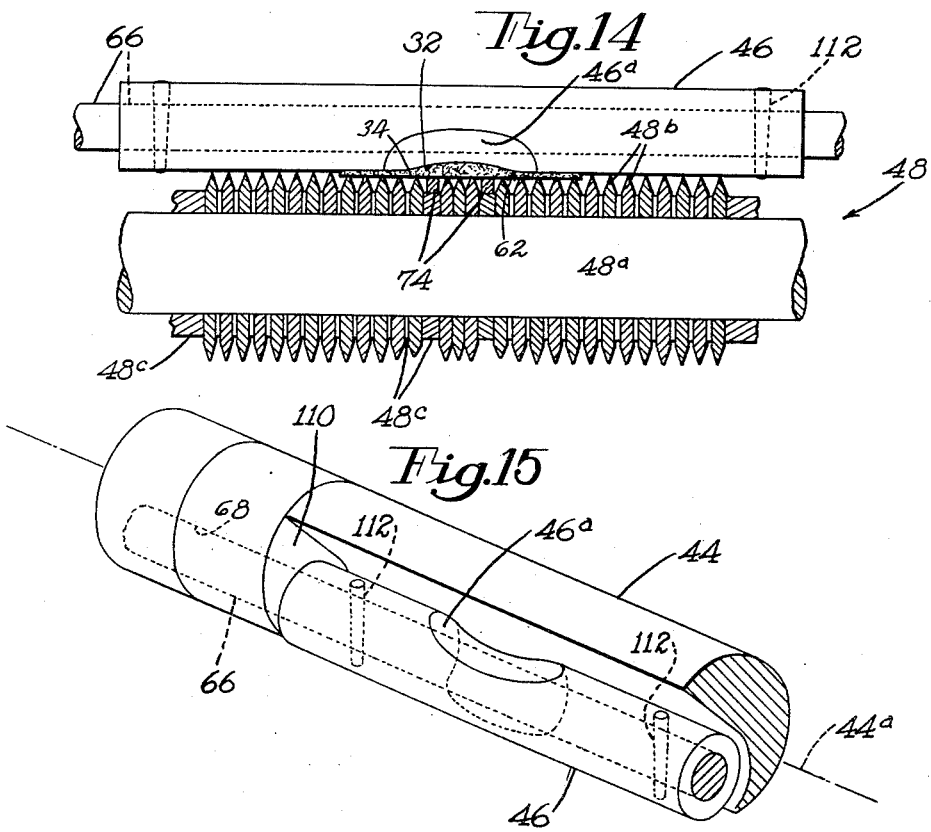

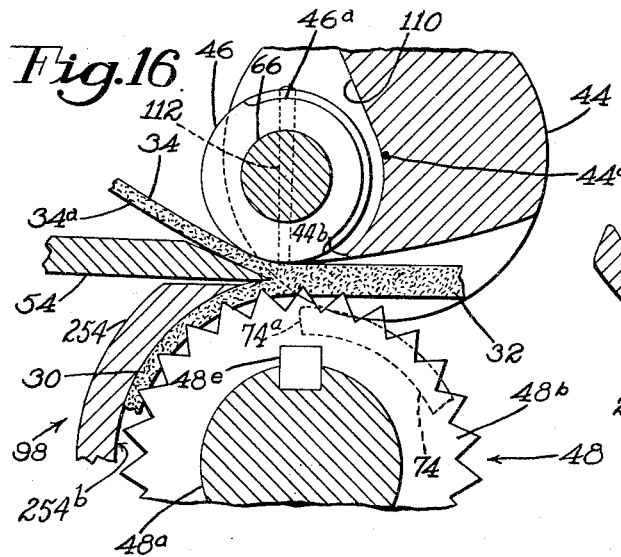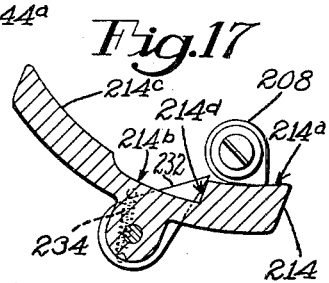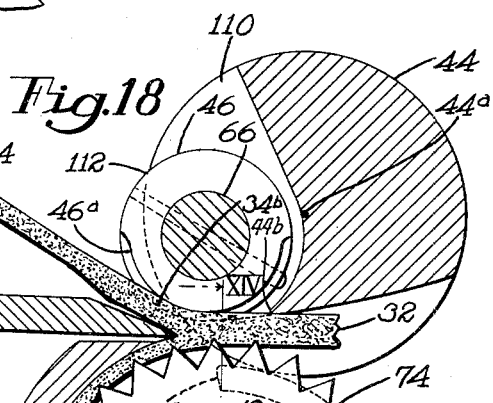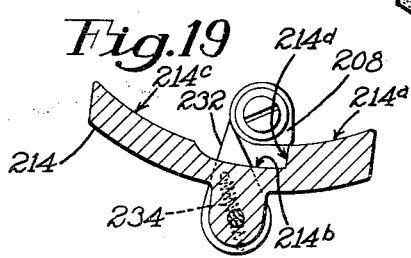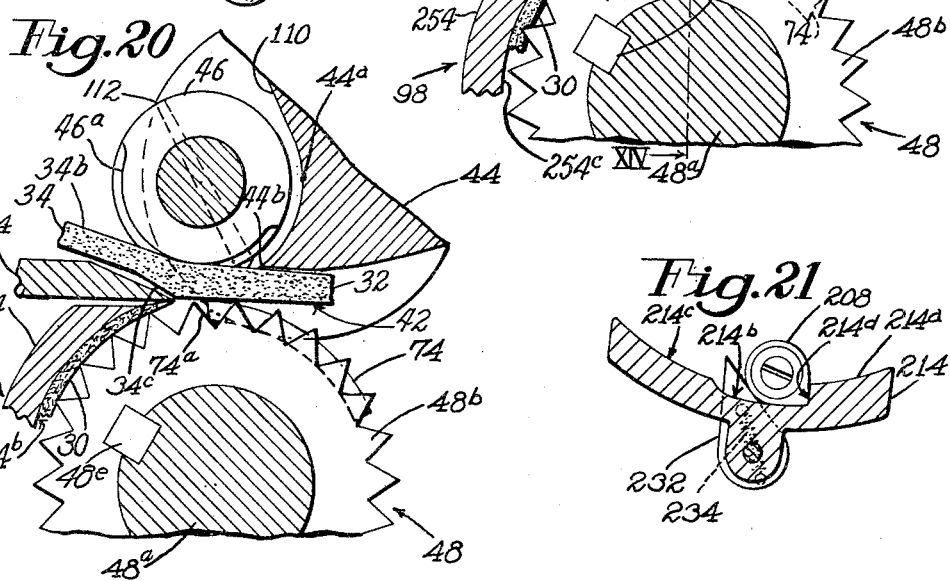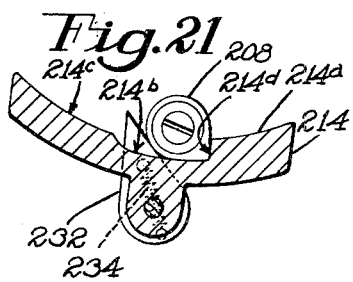

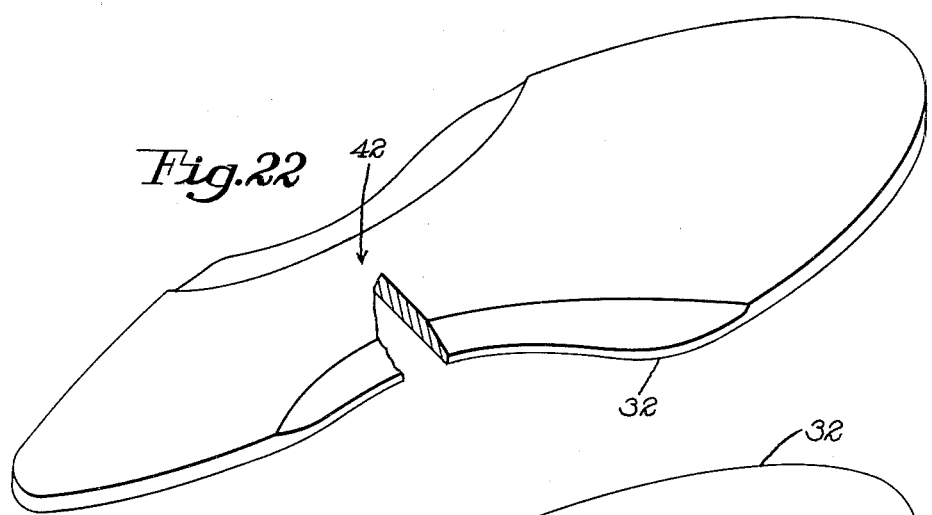
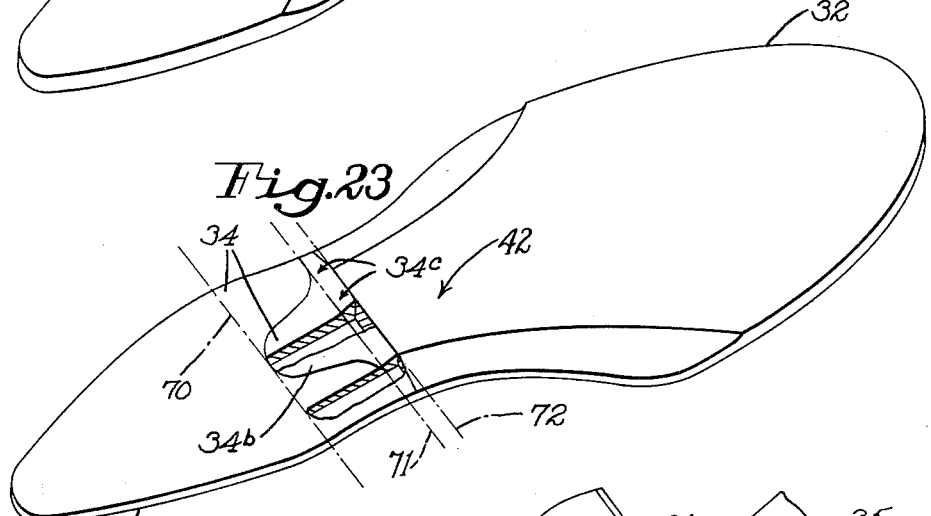
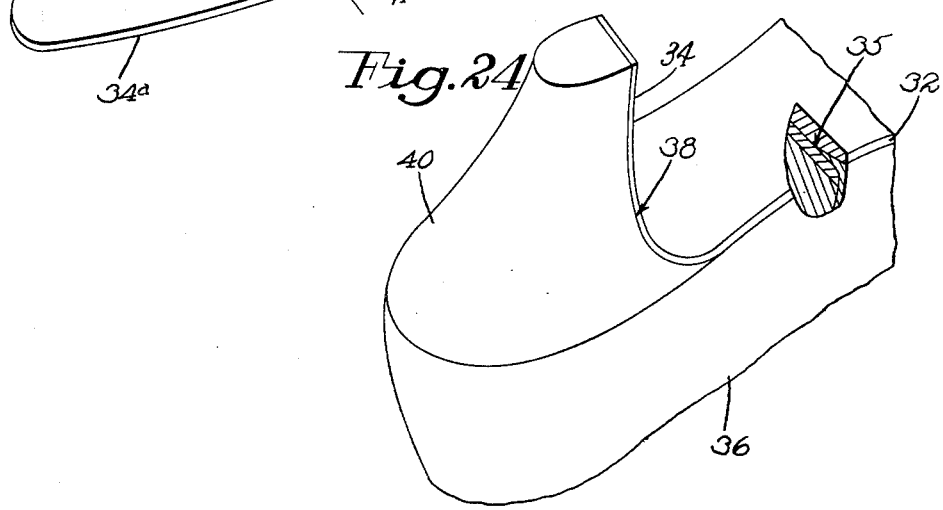

United States Patent Office 3,069,706
Patented Dec. 25, 1962

3,069,706
OUTSOLE TRIMMING MACHINES
Robert F. Lane, Danvers, Mass., assignor to United Shoe Machinery Corporation, Flemington, N.J., a corporation of New Jersey
Filed Oct. 12, 1960, Ser. No. 62,266
17 Claims. (Cl. 12—16.5)

This invention relates to machines for trimming surplus material from the rear or heel end of an unattached outsole of a shoe to prepare said outsole for simultaneous attachment to the bottom of the shoe and to the breast of a Louis heel attached to the shoe, the illustrative machine being generally similar to a machine which is the subject matter of United States Letters Patent No. 3,028,613, granted April 10, 1962 on an application in my name.

It is an object of the present invention to provide an improved machine of the type disclosed in said Letters Patent No. 3,028,613 for forming on an outsole by a trimming cut a heel breast covering portion, a median section of a forward part of which may be quickly and effectively reinforced at selected localities and the forward terminal end of which joins on a steep bevel the flesh or inner side of the outsole just forward of the heel breast line of said outsole.

With the above object in view the present invention consists in novel features comprising an improved matrix roll which during the first stage of the trimming operation is fixed against rotation and is dragged along the outsole and which during a second stage of said operation is power rotated against the outsole for purposes hereinafter explained, reference being had to the accompanying drawings which illustrate one embodiment of the invention selected for purposes of illustration, said invention being disclosed in the following description and claims.

In the drawings:

FIG. 1 shows in perspective an operating head of the illustrative machine with an outsole presented thereto;

FIG. 2 is a sectional view on the line II—II of FIG. 3 of a work supporting table of the illustrative machine and of gaging mechanism for positioning the heel end of the outsole upon the table;

FIG. 3 shows in plan a portion of the work supporting table and the outsole gaging mechanism illustrated in FIG. 2;

FIG. 4 shows in plan, partly broken away, a portion of the machine at the time that a carrier thereof is at a forward end of its operating stroke;

FIG. 5 is a section, with parts removed, on the line V—V of FIG. 4;

FIG. 6 is a side view on the line VI—VI of FIG. 4 showing in detail mechanism for operating a deflector bar which is journaled on the carrier;

FIG. 7 is a longitudinal section, partly broken away, on the line VII—VII of FIG. 4, illustrating work supporting and positioning mechanism and carrier driving mechanism of the machine;

FIG. 8 shows the machine, portions of which have been broken away, partly in front elevation and partly in section;

FIG. 9 is a section on the line IX—IX of FIG. 8 showing details of a one-way clutch;

FIGS. 10 and 11 show in side elevation, with parts removed, on the line X—X of FIG. 8, portions of the carrier and matrix roll actuating mechanism, which is mounted on said carrier, during two different stages of the outsole trimming operation;

FIG. 12 is an enlarged longitudinal median sectional view showing the relative positions of a trimming knife, the deflector bar, a matrix roll and a pronged work supporting roll, all of which are supported by the carrier, when the machine is idle;

FIG. 13 is a view on the line XIII—XIII of FIG. 5 showing, when the machine is idle, the relative positions of a crank actuated cam and a deflector bar controlling rod of the machine;

FIG. 14 is a view, partly in section, on the line XIV—XIV of FIG. 18 showing a heel breast covering portion being formed on the outsole;

FIG. 15 shows the deflector bar and the matrix roll, which is carried by the bar, in perspective;

FIG. 16 is a view generally similar to FIG. 12 showing the machine in the process of forming on the outsole a breast covering portion of uniform thickness;

FIG. 17 is a view similar to FIG. 13 showing the positions of the crank actuating cam and the deflector bar controlling rod during the portion of the cycle illustrated in FIG. 16;

FIG. 18 is a view similar to FIG. 16 but showing the relative positions of the trimming knife, the deflector bar, the matrix roll and the pronged work supporting roll when the reinforced forward or base portion of the heel breast covering of the outsole is being formed;

FIG. 19 is a view similar to FIGS. 13 and 17 showing the relative positions of the crank actuated cam and the deflector bar controlling rod during the portion of the operation illustrated in FIG. 18;

FIG. 20 is a view corresponding to FIGS. 12, 16 and 18 showing the relative positions of the trimming knife, the deflector bar, the matrix roll and the pronged work supporting roll at the terminal end of the trimming cut on the outsole;

FIG. 21 is a view similar to FIGS. 13, 17 and 19 showing the relative positions of the crank actuated cam and the deflector bar controlling rod at the terminal end of the trimming cut;

FIGS. 22 and 23 show respectively a shank reduced outsole before and after it has been trimmed by the illustrative machine; and FIG. 24 is a perspective view of a rear end portion of a shoe to the overlasted bottom and the breast of an attached heel of which the outsole illustrated in FIG. 23 has been attached by the use of cement, the heel breast covering portion of the outsole after its attachment to the heel having been trimmed flush with lateral breast edges and a top lift receiving face of the heel.

The illustrative machine is described with reference to removing a chip of surplus material 30 (FIGS. 16, 18 and 20) from the rear end portion of an unattached outsole 32 which has already been shank reduced, to form a heel breast covering or covering portion 34 (FIG. 23) at the rear end of the outsole. The outsole 32 is subsequently attached in one operation by the use of cement to a bottom 35 (FIG. 24) of a shoe 36 and to a breast 38 of a heel 40, which has been already attached to the shoe, by the use of a machine such as disclosed in United States Letters Patent No. 3,055,027, granted September 25, 1962 on an application filed in the name of Helge Gulbrandsen. The process above described is commonly referred to as the outsole and breast flap attaching process and will be hereinafter referred to as such.

It will be noted that the trimmed outsole 32 shown in FIG. 23 does not have the coneventional heel seat portion (not shown) which remains as part of the outsole after the flap has been split therefrom and which is subsequently trimmed in a heel seat fitting operation after the attachment of the outsole to the shoe, whereby to provide a so-called heel seat tab (not shown) which in the finished shoe is engaged by the attaching face or "cup" of the heel of the shoe. Accordingly the outsole 32 shown in FIG. 23 may be referred to as a "tabless" outsole.

After the attachment of the outsole 32 to the bottom 35 of the shoe 36 and to the breast 38 of the heel 40 of said shoe the projecting lateral margins of the flap are trimmed flush with the breast edges of the heel in the usual manner. The heel breast covering portion 34 of the outsole 32 has a thin marginal portion 34a which is of approximate uniform thickness and of substantial area and a relatively thick or reinforced median base or base portion 34b. It will be noted that the heel breast covering portion 34 of the outsole 32 has at its base a sharply beveled face 34c which is formed at the end or terminal portion of the trimming operation and results in the merging of the inner or flesh face of the heel breast covering portion of the outsole with an inner face 42 of the shank portion of said outsole.

As above explained, the construction of shoes by the use of "tabless" outsoles is more economical than and has to a large extent superceded prior conventional shoe constructions which utilized an outsole having a heel breast covering flap (not shown) which is split from but remains attached to the outsole and is quickly and effectively formed, for example, by the use of the machine disclosed in United States Letters Patent No. 2,677,140, granted May 4, 1954 on an application filed in my name and is also disclosed in United States Letters Patent No. 2,603,802, granted July 22, 1952 on an application filed in my name.

The present machine comprises a deflector bar 44 having journaled on it a matrix roll 46 provided with a cavity 46a, a pronged or toothed supporting roll 48 which rotates counterclockwise as viewed in FIGS. 5, 7, 12, 16, 18 and 20 and is spring-urged, until limited by stop screws 50 (FIGS. 1, 4 and 8) hereinafter referred to, toward the matrix roll and which forms a passage or opening 52 (FIGS. 5, 8 and 12) with the matrix roll. The matrix roll 46, the outsole supporting roll 48 and a knife 54 having a cutting edge 54a are supported on a carrier 56 which, as will be hereinafter explained, reciprocates along ways 58 of a main frame 60, the supporting roll moving counterclockwise as viewed in FIGS. 5 and 7 in response to forward movement of the carrier at a variable speed but remaining motionless on the carrier during rearward movement of said carrier as will be explained later. The peripheral speed of the pronged outsole supporting roll 48, during forward movement of the carrier 56 from its rear or retracted position to its forward or projected position, is substantially the same as the variable speed of the carrier 56 along the ways 58 and accordingly during the forward movement of the carrier there is little movement of the outsole, which is initially positioned in the machine by means hereinafter explained, the oncoming or forwardly moving knife 54 being effective to trim surplus material from the outsole 32 which is flexed or deformed to a predetermined shape by reason of its being forced by the pronged roll against a pressure line portion 62 of the matrix roll 46. The matrix roll has a periphery provided with a primary pressure line portion elements of which are straight and a secondary pressure line portion the opposite ends of the elements of which are straight and intermediate portions of the elements of which are dished.

The matrix roll 46 is secured to a shaft 66 journaled in bores 68 of the deflector bar 44 which has a deflector edge 44b. As will be hereinafter explained, while surplus material is being trimmed progressively forward of the outsole 32, starting at its rear end, to a transverse reference line 70 (FIG. 23) of the outsole, the matrix roll 46 remains fixed on the deflector bar 44 and serves as a drag bar and during the trimming of the flap between the transverse reference line 70 and a transverse reference line 71 of the outsole the matrix roll is rotated at the same peripheral speed as the pronged outsole supporting roll 48, the matrix roll 46 serving to assist the pronged roll in holding the outsole against the action of the cutting edge 54a of the knife 54 and in the forcing of different pressure line portions 62 of the matrix roll against the outsole so as to form the reinforced median base portion 34b of the heel breast covering portion 34 of the outsole. As the trimming cut reaches the reference line 71 of the outsole 32 the deflector bar 44 starts to swing clockwise from its position shown in FIG. 18 toward its position shown in FIG. 20 about an axis 44a of the bar causing the matrix roll 46 to be moved bodily away from the pronged roll 48 and the knife 54 whereby to allow the outsole raised by an elevator or an auxiliary outsole support 74, to be moved upwardly across a plane of the rectilinear path of movement of the cutting edge 54a of the knife 54. Just after reaching a heel breast line 72 (FIG. 23) of the outsole 32 the full thickness of the heel breast line portion of the outsole will have been moved above the plane of movement of the cutting edge 54a of the knife 54, and the sharp bevel 34c formed on the outsole during the end of the trimming cut will terminate at the inner face 42 of the shank portion of the outsole. It will be noted that during the forming of the sharp bevel 34c on the outsole the heel breast line portion of the outsole will have been moved away from the prongs of the supporting roll 48 but the rotating matrix roll at this time will assist mechanism hereinafter described in the holding of the outsole against displacement against the action of the trimming knife. By rotating the matrix roll 44 at the same peripheral speed as that of the prongs 48b of the supporting roll 48 upon which the outsole is supported, there is provided a rolling action between the outsole and the matrix roll and accordingly there is no drag on the outsole.

The carrier 56 comprises a transversely arched portion 56a and has the knife 54 secured to it by screws 76 (FIG. 4, 5 and 7), the deflector bar 44 being journaled in bearings 56b for movement about the axis 44a of the bar. The work supporting roll 48 is rotatable in bearings 78 (FIG. 8) mounted in the forward ends of side arms 80, 80a which are secured to studs 82, 82a respectively journaled in side walls of the carrier 56. The work supporting roll 48 has operatively connected to it, as viewed from the front of the machine, through a one-way clutch 84 (FIGS. 8, 9 and 10), a gear 86 operatively connected through a pair of idler gears 88, which are mounted on bearing studs 90 threaded into the arm 80, with a gear 92 rotatably mounted on a bearing screw 94 threaded into the stud 82 and meshing with a rack 96 (FIGS. 4, 8 and 10) secured to the main frame 60.

The pronged roll 48 comprises a shaft 48a having mounted on it a plurality of toothed or pronged disks 48b separated by washers 48c clamped together by collars 48d which are pinned to and threaded onto the shaft respectively, a key 48e preventing rotation of the toothed disks on said shaft. The one-way clutch 84 (FIG. 9) comprises a disk 84a which is formed integral with the shaft 48a of the pronged roll 48 and which has a plurality of peripheral recesses 84b of tapering depths, the recesses having housed in them spring-pressed balls 84c bearing respectively against the bottoms of the associated recesses and against an inner peripheral face of the gear 86. The outsole 32 is impaled on the toothed or pronged disks 48b of the roll 48 and in order to render the teeth or prongs of said disks effective in the supporting of outsoles provided with shank reduced portions, the diameters of the disks at the mid-portion of the roll may be reduced. When the carrier 56 moves forwardly the gear 86 is rotated clockwise as viewed in FIG. 9 causing the disk 84a of the one way clutch 84 and accordingly the pronged roll 48 to rotate counterclockwise as viewed in FIGS. 5, 12, 16, 18 and 20. When the carrier 56 moves rearward to its starting or retracted position the gear 86 rotates counterclockwise (FIG. 9) about the then idle disk 84a which is held against rotation by mechanism which will be presently described and also by the chip of surplus material 30 positioned between the prongs 48b of the roll 48 and a spring-actuated member 98 which is adapted to force the chip of surplus material 30 against the pronged roll to assist in supporting the outsole against the action of the oncoming knife 54. The pronged roll 34 is prevented from rotating freely on the side arms 80, 80a by the provision of a drum 97 (FIGS. 4 and 8) which is secured to the shaft 48a and has constantly forced against it a spring-pressed brake 99.

The side arms 80, 80a, in which the pronged roll 48 is rotatably mounted, are constantly urged upwardly by heavy springs 100 surrounding rods 102 which pass through bores 104 in laterally projecting lugs of the carrier 56 and the lower ends of which are threaded into the side arms. The springs 100 bear against the lugs of the carrier 56 and are confined by washers 106 and nuts 108 on the upper ends of the rods 102. Upward movement of the side arms 80, 80a, and accordingly the pronged roll 88, is limited by engagement of said arms with the stop screws 50 which, as above explained, are threaded into the lugs of the carrier 56.

The deflector bar 44, which is provided with the bores 68 for receiving the shaft 66, also has at its forward portion a median recess 110 adapted to receive the matrix roll 46 which is secured to the shaft by pins 112.

Secured by a screw 118 to the carrier 56 is a platform 120 (FIGS. 4, 8, 10 and 11). The left end of the shaft 66 extends through a bore 122 in a casing 124 which has a rearwardly projecting lug 126 pivotally connected by a bearing pin 128 to a link 130 journaled on a pin 132 carried by a clevis 134 secured by a screw 136 to the platform 120. The left end of the shaft 66, as viewed from the front of the machine, has keyed to it a pinion 138 provided with a sleeve extension which is journaled in the bore 122.

The casing 124 has a plurality of openings for receiving bolts 140, 140a, and 140b having nuts threaded onto them and serving together with the nuts to secure a cover plate 142 to the casing which together with the plate constitutes a housing. Journaled on a spacer sleeve mounted on the bolt 140a is a segment gear 146 having teeth and a depending arm portion carrying a roller 148. The segment gear 146 has secured to it a rod 150 slidable in arcuate slots 152, 152a formed respectively in the casing 124 and the cover plate 142, said rod being constantly urged to its rest position (FIG. 10), in which it engages the forward ends of the slots, by a pair of springs 154 the upper ends of which are attached to studs secured to the casing and to the cover plate and the lower ends of which are secured to the rod.

Journaled on a spacer sleeve mounted on the bolt 140b is an idler gear 158 which meshes with teeth of the segment gear 146 and with teeth of the pinion 138. It will thus be clear that the housing formed by the casing 124 and the plate 142 is supported at its lower forward end through the shaft 66 and at its rear end by the bearing pin 128 connected to the link 130, the construction and arrangement being such that the housing, which may be described as "floating," may partake of the slight vertical swinging movement of the shaft 66 as it is raised and lowered in response to the movement of the deflector bar 44 as will be hereinafter explained.

Adjustably secured by a screw and slot connection 160 to an upstanding portion of the main frame 60 is an abutment 162. As the carrier 56 moves forwardly along the ways 58 the roller 148 mounted on the segment gear 146 engages the abutment with the result that forward movement of the roll ceases and as the carrier continues to move forwardly the segment gear swings clockwise (FIG. 11) on the carrier and accordingly the periphery of the matrix roll 46 rotates clockwise as viewed in FIGS. 18 and 20 about the axis of its shaft 66 at substantially the same peripheral speed as the tips of the prongs of the outsole supporting roll 48 rotate about the axis of said roll. As this occurs portions of the matrix cavity 46a of the roll 46, which portions progressively increase in width and depth, are brought into engagement with the outsole 32 with the result that the portion of the flap included between the reference line 70 and the heel breast line 72 is formed, rotation of the matrix roll assisting in holding the outsole against the cutting edge 54a of the knife 54.

As will be explained later, as the cutting edge 54a of the knife 54 reaches the reference line 71 of the outsole 32 the deflector bar 44 is swung clockwise as an entirety about its axis 44a to its position shown in FIG. 20 with the result that the full thickness of the outsole is raised across the plane or path of movement of the cutting edge of the knife to form the steep shoulder 34c on the outsole.

The carrier 56 is reciprocated along the ways 58 of the main frame 60 by a connecting rod 164 which comprises a forward part 164a and a rear part 164b adjustably secured to said forward part by the use of a bolt 165 and which is pivotally coupled to the carrier 56 by a vertical pin 166 extending between the arched portion 56a of the carrier and a transverse rib 56c (FIGS. 5, 7 and 8) of the carrier. The rear end of the connecting rod 164 is pivotally connected to a crank 168 (FIGS. 1, 4 and 7) at the upper end of a shaft 170 which is driven by a worm 172 operatively connected to a worm gear 174 secured to the bottom of the shaft. Interposed between the shaft 170 and the crank 168 is a one-revolution clutch 176 controlled by a cable 178 extending over a cross rod 180 on the main frame 60 and downward to a treadle (not shown).

As above explained the knife 54 is so adjusted in the carrier 56 by the use of the screw 76 that its cutting edge 54a lies in the opening 52 between the lower pressure line portion 62 of the matrix roll 46 and the common locus of the apices of the teeth or prongs of the outsole supporting roll 48. The width of a gap 182 (FIG. 12) formed between the lower pressure line portion 62 of the matrix roll 46 and the cutting edge 54a of the knife 54 establishes the thicknesses of the heel breast covering portion 34 of the trimmed outsole 32, the chip of surplus material 30 trimmed from the outsole moving through a passage 184 formed between said cutting edge and the locus of the apices of the teeth of the pronged roll 48.

The machine is provided with an outsole supporting table 186 having a pair of slots 188 through which pass upstanding legs of a work positioning gage 190, said table having journaled on its front end a transverse roller 192 (FIGS. 3 and 7). The table 186 is secured by screws 194 (FIGS. 2, 3 and 8) to the forward ends of the roll supporting arms 80, 80a. Secured by a bar 196 (FIGS. 1 and 7) to a front plate 198 removably attached to and in effect forming part of the main frame 60 is a canvas curtain 200 which passes around the roller 192 mounted on the table 186 and downwardly and forwardly about a cross rod 202 supported by rearward extensions of the front plate. As disclosed in Patent 2,603,802, the curtain is weighted in order that it shall be taut between the front of the machine and the roller 192 as the carrier 56 moves back and forth along the ways 58 of the main frame 60.

The deflector bar 44 has threaded into it an upstanding rod 204 (FIGS. 5, 6, 7 and 8) provided with a circular groove 206 and having mounted on it a cam block 208. Resting in the groove 206 of the rod 204 is one arm of a U-shaped spring 210 secured to a lug of the carrier 56. The rod 204 passes through a slot 212 (FIG. 5) in the carrier 56, the cam block 208 being constantly urged by the spring 210 against a cam 214 having a bifurcated portion 216 which engages in grooves 218 (FIGS. 4 and 5) formed in side faces of an adjustment block 220 mounted on the vertical pin 166 and registering in an arcuate guideway 222 of the forward part 164a of the aforementioned connecting rod 164. The adjustment block 220 is secured in an initially selected position to the connecting rod 164 by a screw 224 threaded into the connecting rod and passing through an arcuate slot 226 in the block which may be considered as part of said rod. The cross screw 228, which extends through a bore in one of the bifurcations 216 of the cam 214 and is threaded into the other bifurcation and which passes through a slot in the block 220, serves to clamp said cam in its desired position to the block. The cam 214 may be initially adjusted lengthwise of the machine by the use of a screw 230 which is rotatable in a horizontal bore of the cam and is threaded into the block 220. The cam 214 comprises track portions 214a, 214b and 214c which are centered approximately about the center of the vertical pin 156, the track portions 214a and 214b being separated by a drop-off shoulder 214d.

When the machine is at rest, the carrier 56 being in its rear or retracted position, the cam block 208 is in its position shown in FIG. 13 in engagement with the track portion 214b. During the first 180° of rotation of the crank 168 clockwise, as viewed from above, from its starting position in FIG. 7 the carrier 56 is moved forwardly and the cam 214 is swung clockwise from its starting position shown in FIG. 13 and then counterclockwise back to its position shown in FIG. 21, the track portion 214a swinging along the block 208 in opposite directions.

At the extreme end of forward movement of the carrier 56 the cam 214, as above stated, is in its position shown in FIG. 21, the block 208, which has been swung forward with relation to the carrier 56 about the axis 44a of the deflector bar 44 into engagement with the track portion 214b of the cam 214, causing the deflector bar to be swung to its position shown in FIG. 20 in which the lower pressure line portion 62 of the matrix roll 46 carried by the bar allows the full thickness of the outsole 32 to be moved across the plane of travel of the cutting edge 54a of the knife 54, first by the spring actuated upward movement of the pronged outsole supporting roll 48 and then by the upward movement of the elevator 74 the construction and operation of which will be hereinafter described in detail.

In order to provide the sharply beveled face 34c on the heel breast covering portion 34 of the outsole 32 the cam 214 is provided with the drop-off shoulder 214d and the cam block 208 has a square corner adapted to slide along said shoulder. In order that the cam 214 may swing smoothly clockwise from its rest position shown in FIG. 13 causing the track portion 214a of the cam to engage the cam block 208 the cam has pivotally mounted on it a ramp 232 which is constantly urged clockwise as viewed in plan by a spring 234 one end of which is attached to a pin secured to the ramp and the other end of which is secured to a pin secured to the cam.

The operator places the rear end of the untrimmed outsole 32 on the table 186 with its inner face or flesh side downward and with its rear end in engagement with a V-shaped upper end of the gage 190 which at this time projects slightly above the table. When the one-revolution clutch 176 is engaged the crank 168, which is then in its rear or rest position shown in FIG. 7, starts to rotate clockwise as viewed from above. As the carrier 56 starts to move forwardly along the ways 58 the cam 214, together with the ramp 232 which is then in engagement with the upper end of the shoulder 214d as shown in FIG. 13, swings clockwise as viewed from above causing the ramp to swing clockwise past the block 208 with the result that the track portion 214a of the cam is brought into engagement with said block and the deflector bar 44 is swung counterclockwise about its axis 44a against the action of the spring 210 from its position shown in FIG. 12 to its position shown in FIG. 16 in which the lowermost pressure line portion 62 of the matrix roll is in its lowered position whereby to form with the cutting edge 54a of the knife 54 a minimum gap 182 for the particular work on hand. It will be noted that when the ramp 232 is thus positioned its apex projects a slight distance beyond the track portion 214a. Accordingly, shortly before the forward limit of movement of the carrier is reached as the cam 214 is swung counterclockwise with relation to the cam block 208, the roll engages the apex portion of the ramp 232 and swings said ramp clockwise with relation to the cam, to its position in FIG. 21, the cam block being swung substantially about the axis 44a of the deflector bar 44 into engagement with the track 214b of the cam 214 by the action of the spring 210. When this occurs the lowermost pressure line portion 62 of the matrix roll 46 as above explained forms a gap 182 of maximum width with the cutting edge 54a of the knife 54, the width of said gap being approximately equal to the full thickness of the outsole. As above explained, the cam block 208 has a square corner portion which allows the block abruptly to fall off the face 214a so as to insure that the rather steep shoulder 34c shall be formed in the vicinity of the heel breast line 72 of the outsole.

Near the extreme end of the trimming cut the pronged roll 48 will have reached the limit of upward movement by reason of the roll supporting arms 80, 80a engaging the stop screws 50, the locus of the apices of the teeth of said roll then being spaced approximately eight thousandths of an inch from the cutting edge 54a of the knife 54. As above explained, at this time the chip of surplus material 30 is nearly severed from the outsole 32 and cannot be relied upon to assist materially in holding the work against the oncoming knife 54. If the chip of surplus material 30 is solely relied upon at this time to hold the work against the action of the knife 54 there is a tendency excessively to tear the outsole at the terminal end of the cut and this leaves attached to the outsole long stringy fibers which are objectionable. In order to form the steep bevel face 34c it has been found necessary to force the heel breast line portion of the outsole 32 firmly against the lowermost pressure line portion 62 of the matrix roll 46 by the upward supporting movement of the elevator 74.

The elevator 74 comprises a pair of arcuate fingers 74a (FIGS. 7, 8, 12, 16, 18 and 20) which are interposed between adjacent pairs of toothed disks 48b at the central portion of the outsole supporting roll 48 and are raised in timed relation with the forward movement of the carrier 56 to force the portion of the outsole being trimmed against the lowermost pressure line portion 62 of the matrix roll. The arcuate fingers 74a are normally spring urged against the peripheries of the adjacent washers 48c, prongs of the roll 48 projecting well above the fingers as best shown in FIG. 12.

The fingers 74a of the elevator 74 are formed integral with an L-shaped portion 74c (FIG. 7) which is journaled on a fulcrum pin 236 carried by a lug secured to and depending from the table 186. The L-shaped arm 74c is constantly biased counterclockwise as viewed in FIG. 7 by a spring 238 supported by a lower plate 240, hereinafter referred to, bolted to the table 186 and normally adapted to force the fingers 74a of the elevator 74 against adjacent wide separator washers 48c at the central portion of the work suporting roll 48, the construction being such that the peripheral faces of the fingers 74a of the elevator normally lie radially within the common locus of the prongs or teeth of the adjacent disks 48b.

The L-shaped arm 74c of the elevator 74 is swung clockwise as viewed in FIG. 7 about the fulcrum pin 236 near the forward end of movement of the carrier 56 by engagement with an actuator arm 242 which is pivotally mounted on a bearing pin 244 secured to a bifurcated angle plate 246 fixed to and in effect forming part of the main frame 60. The actuator arm 242 is normally held in its idle position against a stop face 248 of the angle plate 246 by a spring 250 the forward end of which is attached to the actuator arm and the rear end of which is attached to a stud secured to the main frame 60.

When the carrier 56 has moved forward to a position in which the rear end portion of the outsole 32 has been split forward to the reference line 71 (FIG. 23) the deflector bar 44 and accordingly the matrix roll 48 start to swing about the axis 44a of the deflector bar from the position shown in FIG. 18 to the position shown in FIG. 20 and simultaneously therewith the L-shaped arm 74c of the elevator 74 engages the actuator arm 242 causing the heel breast line portion of the outsole to be forced by said elevator against the lowermost pressure line portion 62 of the matrix roll 46 as the gap 182 is opened to a width substantially equal to the full thickness of the portion of the outsole being trimmed. During the first part of this swinging movement of the deflector bar 44 the pronged roll 46 will normally be raised slightly under the action of the springs 100 until limited by the stop screws 50. In the meanwhile the rear ends of the fingers 74a of the elevator 74 maintain the outsole in forced engagement with the lowermost pressure line portion 62 of the matrix roll 46 to insure that the entire thickness of the outsole is moved across the plane of movement of the cutting edge 54a of the knife 54 to complete the trimming cut at the inner or flesh side 42 of the outsole, the sharply beveled face 34c being formed on the outsole during this cut.

Although the outsole 32 has been lifted from the prongs at the upper portion of the outsole supporting roll 34 by the elevator 74, the prongs acting against the chip 30, which is trimmed from the outsole 32, at this time serve to assist in holding the outsole 32 against movement under the action of the cutting edge 54a of the oncoming knife 54. It will also be noted that at this time there is a marked tendency for the knife 54 to suck the outsole 32 up through the gap 182. Moreover the portion of the matrix roll 46 in engagement with the outsole at this time is rotating in a direction opposite to the direction of movement of the carrier 56 and at substantially the same speed as the carrier, thus assisting in holding the outsole, which is pressed by the elevator 74 against the matrix roll, against movement so that the knife 54 will effectively complete the trimming cut at the flesh side 42 of the outsole 32.

As the carrier 56 is moved rearward to its retracted or starting position after the trimming operation has been completed, the cam 214 swings counterclockwise, as viewed from above, about the axis of the fulcrum pin 166, the track 214c of the cam being brought into engagement with the cam block 208 with the result that the deflector bar 44 is swung counterclockwise slightly from its position shown in FIG. 20. After the ramp 232 has been swung counterclockwise, as viewed from above, past the cam block 208 it is swung clockwise on the cam 214 by the action of the spring 234 to its idle position against the upper end of the shoulder 214d of the cam. As the carrier 56 moves to its retracted position the outsole 32, which is held stationary by the operator, is removed from the machine, the pronged roll 48, as above described, during the retraction of the carrier, being inactive on the carrier. As the carrier 56 moves back to its retracted position the roll 148 on the segment gear 146 moves away from the abutment 162 and thus permits the gear to return to its idle starting position shown in FIG. 10 by the action of the springs 154.

The spring actuated presser member 98 comprises an arcuate foot 254 having a guide portion 254a (FIGS. 4 and 5) mounted for reciprocation in a guideway 256 of a bearing block 258 secured by screws 260 to the carrier 56. The arcuate foot 254 is constantly urged toward the pronged roll 48 by spring-pressed plungers 262 slidingly mounted in bores 264 of the block 258, movement of said arcuate foot toward the roll being limited by a stop 266 which is secured to the block and extends into a slot 268 formed in the guide portion 254 of said foot. A work-engaging face 254b of the arcuate foot 254 is arranged for the most part approximately concentric with the locus of the apices of the prongs of the toothed disks 48b so that said foot will properly accommodate surplus material of different shapes trimmed from the outsole 32. As above explained, during the trimming operation the chip of surplus material 30 is impaled by the presser member 98 onto the pronged disks 48b of the work supporting roll 48 and during rotation of said roll exerts a constant counterclockwise pull (FIGS. 16, 18 and 20) against the outsole to assist in holding it substantially stationary against the trimming action of the forwardly moving knife 54.

As above explained, the outsole 32, placed on the bar 196 and upon the canvas curtain 200 is manually positioned upon the table 186 by engaging the rear end of the outsole with the gage 190 which, when the machine is at rest or at the end of the cycle, extends slightly above the table, said gage being mounted on a U-shaped support 270 (FIGS. 3 and 7). As above explained, the table 186 is attached by the screws 194 to the forward ends of the arms 80, 80a which carry the pronged roll 48. The U-shaped support 270 is carried by a fulcrum pin 272 extending between the rear up-turned ends of a block or slide 274 which is supported slidingly on the inner and top faces of the ways 58 and is provided with a friction gib 276 serving to resist movement of the block on said ways. The gage carrying support 270 is constantly urged to its raised position by a spring 278 opposite ends of which are mounted respectively in recesses of the block 274 and a cross bar of the support.

The block 274 is moved forwardly by pins 280 secured to the carrier 56 and adapted to engage upstanding flange portions 282 of the block. The block 274 is moved rearwardly by depending lugs 284 (FIGS. 2, 3 and 7) which are T-shaped in transverse cross section and are adjustably mounted initially in grooves 286 formed in the under side of the cross or lower plate 240 secured at its lateral margins by screws 288 to the bottom of the lateral ends of the table 186. The adjusted positions of the lugs 284 may be varied lengthwise of the grooves 286 to control the timing of the depression of the gage support 270, by mechanism which includes an intermediate cross plate 290 having formed in it diagonal slots 292 adapted to receive pins 294 which extend upward from the lugs 284 and pass through longitudinally elongated slots 296 in the lower plate 240.

The intermediate plate 290 has depending portions fitting slidingly in slots 298 in the lower plate 240. The intermediate plate 290 has also threaded into it a hand screw 300 the shank of which passes through a transverse slot 302 in the table 186, a head of said screw serving as a handle for use in the sliding of said intermediate plate transversely of the machine with relation to the table and also serving as a clamp for securing the intermediate plate in its adjusted position to the table. When the screw 300 registers at the left end of the slot 302 a forward movement of the carrier 56 for about one-quarter of an inch causes the gage 190 to disappear below the upper face of the table 186. Adjustment of the screw 300 to the right necessitates a longer forward motion of the carrier 56 before the gage 190 is depressed. Depression of the gage support 270 is effected by a depending cam portion 304 (FIG. 7) of the lower plate 240 adapted to engage an inclined surface 306 of the U-shaped support 270, said cam portion cooperating with said inclined surface to depress the U-shaped support 270 soon after the carrier 56 starts its forward motion to grip the end of the outsole 32 between the matrix roll 46 and the pronged work supporting roll 34. At this time the side pins 280 on the carrier 56 engage the flanges 282 of the block 274. For the rest of the forward movement of the carrier 56 the block 274 and the gage support 270 remain in the same positions with relation to the carrier.

When the carrier 56 starts its rearward movement back to its retracted position the pins 280 move away from the upright flanges 282 of the block 274 and because of the friction between the block and the ways 58 said block remains motionless until the depending lugs 284 engage the forward end of the block 274 and move it rearward. Just before this occurs the cam portion 304 of the lower plate 240 will have moved out of engagement with the cam surface 306 on the U-shaped gage support 270 thereby allowing the gage 190 to rise to its raised position.

Having thus described my invention, what I claim as new and desire to secure by Letters Patent of the United States is:

1. In a machine for trimming material from the heel end of an outsole, a support having a plurality of prongs adapted to be engaged by an outsole, a matrix, a knife positioned between the matrix and the support, means for yieldingly moving the support as an entirety toward the matrix whereby to force the outsole against the matrix, means for effecting relative movement between the prongs of the support on the one hand and the matrix and the knife on the other hand to cause the outsole forced against the matrix to be trimmed lengthwise to a shape determined by said matrix, and means for effecting a dragging action between the matrix and the outsole during a portion of the operation of said second-named means and for effecting a relative rolling action between the matrix and the outsole during another portion of the operation of said second-named means.

2. In a trimming machine, a knife having a cutting edges, a matrix roll having a periphery postioned adjacent to and extending along the cutting edge of the knife, a supporting roll which has peripherally arranged prongs and is movable as an entirety toward the matrix roll to force a work piece against the periphery of said matrix roll, means for effecting relative movement between the knife and the matrix roll on the one hand and the prongs of the supporting roll on the other hand to cause the knife progressively to trim by a splitting cut a chip of surplus material from said work piece, and means for causing the matrix roll to remain stationary with relation to the knife during the first part of the trimming operation whereby to effect a dragging action between the roll and the work piece and for causing, during a second part of the trimming operation, the outsole engaging portion of the matrix to rotate under power with relation to the knife at substantially the same speed as and in a direction opposite to the direction of movement of the prongs of the supporting roll whereby to effect a rolling action between the matrix and the outside.

3. In a machine for forming a heel breast covering at the rear end of an outsole, a support having a plurality of prongs adapted to be engaged by an outsole, a knife having a cutting edge, a matrix roll, means for effecting relative movement between the prongs of the support on the one hand and the matrix roll and the knife on the other hand to effect relative movement between the outsole on the support and the matrix bar and the knife to cause material to be trimmed by the knife from the outsole conformed to a predetermined shape by the combined operation of the pronged support and the matrix roll, and means for retaining the matrix roll in a fixed position with relation to the knife during the first part of the trimming operation whereby to effect a dragging action between the matrix roll and the outsole and for causing, during the last part of the trimming operation, the matrix roll to rotate under power with rolling action against the outsole.

4. In a trimming machine, a matrix roll, a knife having a cutting edge forming a gap with said roll, mechanism for bodily moving relatively to the knife the matrix roll as an entirety into different active positions to increase or decrease the width of said gap, a stop, a support, said support comprising a plurality of prongs adapted to be engaged by a work piece, spring actuated means for moving, until limited by said stop, the support as an entirety toward the knife and the matrix roll to cause the work piece to be forced against the roll, means for effecting relative movement at substantially right angles to said movement of said support as an entirety between the matrix roll and the knife on the one hand and the prongs which are in engagement with the work piece on the other hand to cause the knife to trim from said work piece on the support material forced against the matrix roll by said support, means for moving a portion of the work said first-named means for moving a portion of the work piece immediately in advance of the cuting edge of the knife away from the support and against the matrix roll when motion of the support toward the matrix roll has been limited by said stop, and mechanism operative in time relation with said first-named means for rotating the matrix roll to cause it to hold against the action of the knife the portion of the outsole which has been pressed against it by said second-named means.

5. In a trimming machine, a knife having a cutting edge, a matrix roll positioned adjacent to and extending along the cutting edge of the knife, a supporting roll, having a plurality of peripheral prongs, a stop, means for yieldingly urging the suppporting roll toward the matrix roll, until it is limited by said stop, whereby to force a work piece against the matrix roll, means for effecting relative movement between the knife and the matrix roll on the one hand and the prongs of the supporting roll on the other hand to cause the knife progressively to trim by a splitting cut a chip of sulplus material from said work piece, means for mainting the matrix roll fixed with relation to the knife during a first portion of the trimming operation and for rotating it during a second portion of the trimming operation, and a member for forcing near the terminal end of the trimming cut a portion of the work piece immediately in advance of the cutting edge of the knife away from the supporting roll, toward the matrix roll which movement of is then limited by the stop, and against the matrix roll which is then rotating.

6. In an outsole trimming machine, a reciprocable carrier, a knife, a presser roll adjacent to the knife and a supporting roll for holding a piece of work against the presser roll, said knife and said presser and supporting rolls being mounted on the carrier for movement along a portion of the length of the work, means for rotating said supporting roll at a speed proportionate to the travel of the knife to present the work to the knife without producing any substantial movement of the work, means for maintaining the matrix roll fixed with relation to the knife during the first portion of the movement of the carrier in one direction, and means for rotating the matrix roll relatively to the knife during the subsequent portion of movement of the carrier in said one direction.

7. In an outsole trimming machine, a base, a rack on the base, a work rest on the base, a carrier, means for reciprocating the carrier in a predetermined path along the base, a knife and adjacent matrix roll on the carrier, a rotatable toothed roll mounted on the carrier and operatively connected to the rack, the top of the toothed roll lying beneath the edge of the knife and cooperating with said work rest to support the work, and means mounted on the carrier for retaining the matrix roll fixed with relation to the knife during one part of the movement of the carrier in one direction in said path whereby to effect a dragging action between the matrix roll and the work and for causing, during a second part of the movement of the carrier in said one direction, the matrix to rotate under power with rolling action against the work.

8. In an outsole trimming machine, a base, a rack on the base, a carrier, means for reciprocating the carrier in a predetermined path along the base, a knife secured to the carrier, a matrix roll mounted on and moveable as an entirety in to different adjusted positions on the carrier, a rotatable toothed roll which is yieldingly mounted on the carrier and is operatively connected to the rack, the top of the toothed roll lying beneath the edge of the knife to support an outsole, and means comprising mechanism floatingly mounted on the carrier for retaining the matrix roll fixed with relation to the knife during one portion of the movement of the carrier in one direction in said path and for moving the matrix roll relatively to the knife during a second portion of the movement of the carrier in said one direction.

9. In a trimming machine, a knife having a cutting edge, work control means comprising a matrix roll and an opposed pronged supporting roll arranged at opposite sides of the cutting edge of the knife, a carrier for said knife and said rolls, means for reciprocating the carrier in opposite directions in a predetermined path, means responsive to movement of the carrier in said path for rotating the pronged supporting roll relatively to the knife, and means mounted on the carrier for maintaining the matrix roll fixed relatively to the knife during the first part of the trimming operation whereby to effect a dragging action between the matrix roll and the outsole and for causing, during a last part of the trimming operation the matrix roll to rotate under power with rolling action against the outsole.

10. In an outsole trimming machine, a carrier, a knife secured to said carrier and having a cutting edge, a matrix roll which is mounted on the carrier and which is arranged adjacent to the cutting edge of the knife and forms a gap therewith, means comprising prongs for supporting an outsole and adapted to cooperate with the matrix roll in the orienting of the outsole thicknesswise to the knife, means for moving the prongs of said outsole supporting means relatively to the carrier and accordingly to the knife whereby to cause the oriented outsole to be split lengthwise by the knife, said matrix roll having a periphery provided with a primary pressure line portion elements of which are straight, and a secondary pressure line portion the opposite ends of the elements of which are straight and intermediate portions of the elements of which are dished, means for maintaining the matrix roll fixed to the carrier and said primary pressure line portion of the matrix roll in engagement with the outsole during a first part of the movement of the prongs of the outsole supporting means and for rotating, during a second portion of the movement of the outsole supporting means relatively to the knife carrier, the matrix roll on the carrier about an axis to cause different conformations of said secondary pressure line portion to be brought into engagement with the outsole.

11. In an outsole trimming machine, a base, a carrier slidable on the base and having secured to it a knife, an adjacent matrix roll, a work supporting roll, a stop, said work supporting roll being mounted on the carrier for movement toward and away from the knife and the matrix roll, means for yieldingly urging said work supporting roll toward the knife and the matrix roll until it is arrested by said stop, means for reciprocating a carrier between retracted and projected positions, means for retaining the matrix roll fixed to and rotatable on the carrier during first and second stages of movement respectively of the carrier in one direction from its retracted to its projected position, and means for moving the matrix roll as an entirety away from the knife at the terminal end of the movement of the carrier in said one direction.

12. In a machine for forming a heel breast covering at the rear end of an outsole, a support having a plurality of prongs adapted to be engaged by an outsole, a knife having a cutting edge, a deflector bar, a matrix roll carried by and rotatable on said bar, means for moving the support as an entirety toward the matrix roll to force the outsole against said roll, means for effecting relative movement between the prongs of the support on the one hand and the knife, the bar and the roll on the other hand to cause relative movement of the outsole and the knife lengthwise of said outsole progressively to trim by a splitting cut surplus material from the outsole flexed to a predetermined shape between the matrix roll and the support, mechanism for maintaining the bar and the roll fixed with relation to the knife during a first stage of the operation of said means, mechanism for maintaining the bar fixed with relation to the knife and for rotating the matrix roll on the bar during a second stage of the operation of said means, and mechanism for rotating with relation to the knife the matrix roll on said bar and for moving the bar and accordingly the matrix roll as an entirety away from the support and the knife during a third and final stage of the operation of said means.

13. In a machine for forming a heel breast covering at the heel end of an outsole, a knife having a cutting edge, means for conforming an outsole to a predetermined shape and for effecting relative movement between the knife and the outsole progressively to trim material from the rear end of said outsole, said means comprising a matrix roll, mechanism for maintaining said roll fixed with relation to the knife during a first stage of the trimming operation, mechanism for rotating said roll about an axis which is fixed with relation to the knife during a second stage of the trimming operation, and mechanism for rotating the roll about said axis while moving the axis away from the knife during a third and final stage of the trimming operation.

14. In a machine for forming a heel breast covering at the rear end of an outsole, a knife having a straight cutting edge, a guide bar having a deflector edge generally parallel to the cutting edge of the knife, a matrix roll mounted on said bar and having a periphery spaced from the cutting edge of the knife to form a gap, a pronged outsole supporting roll which is rotatable about an axis parallel to the cutting edge of the knife and which has prongs, a locus of said prongs being spaced from the cutting edge of the knife to form a passage and forming an opening with the periphery of the matrix roll, means for reciprocating the knife, the pronged roll, the matrix roll and the bar together in a fixed path, means for causing the pronged supporting roll to force the outsole against the matrix roll, means for holding the outsole against the cutting action of the cutting edge of the knife as the knife, the pronged roll and the bar are moved in one direction in said path, mechanism for maintaining said roll fixed with relation to the knife during a first stage of the trimming operation, mechanism for rotating said roll about an axis which is fixed with relation to the knife during a second stage of the trimming operation, and mechanism for rotating the roll about said axis by moving the axis away from the knife during a third and final stage of the trimming operation.

15. A machine for trimming material from the rear end of an outsole having, in combination, a knife provided with an elongated cutting edge, a matrix roll, a supporting roll which has a plurality of prongs adapted to be engaged by an outsole and is spaced from and forming with the matrix roll a notch in which the cutting edge of the knife is arranged, said matrix roll and said pronged roll forming respectively with said cutting edge a gap and a passage, means for yieldingly urging the pronged roll as an entirety toward the matrix roll to force an outsole in said notch against the matrix roll, a stop for limiting movement of said pronged roll toward the matrix roll, power means for effecting relative movement between the knife and the matrix roll on the one hand and the prongs of the supporting roll on the other hand to cause the knife to trim a piece of surplus material from the outsole by a splitting cut starting at the rear end and part way through the outsole impaled on the pronged roll and progressing through the outsole approximately to its heel breast line, the trimmed rear end of the outsole and the chip trimmed from the outsole passing respectively through the gap and the passage, means operative in timed relation with said power means for moving the matrix roll to a position in which it forms with said cutting edge a gap at least as wide as the thickness of the outsole whereby to cause the chip to terminate at an inner face of the outsole just forward of said

UNITED STATES PATENT OFFICE
CERTIFICATE OF CORRECTION

Patent No. 3,069,706                        December 25, 1962

Robert F. Lane

It is hereby certified that error appears in the above numbered patent requiring correction and that the said Letters Patent should read as corrected below.

Column 1, line 16, after "application" insert -- filed --; column 2, line 62, for "coneventional" read -- conventional --; column 4, line 34, for "FIG." read -- FIGS. --; column 11, line 26, for "edges" read -- edge --; line 45, for "outside" read -- outsole --; column 12, line 32, after "roll" insert -- , movement of which --; line 33, strike out "which movement of"; line 52, before "adjacent" insert -- an --.

Signed and sealed this 3rd day of December 1963.

(SEAL)
Attest:
ERNEST W. SWIDER
Attesting Officer

EDWIN L. REYNOLDS
Acting Commissioner of Patents